United States Patent [19]

Chrisopher

[11] Patent Number: 5,233,421
[45] Date of Patent: Aug. 3, 1993

[54] VIDEO MEMORY SYSTEM WITH DOUBLE MULTIPLEXING OF VIDEO AND MOTION SAMPLES IN A FIELD MEMORY FOR MOTION ADAPTIVE COMPENSATION OF PROCESSED VIDEO SIGNALS

[75] Inventor: Todd J. Chrisopher, Indianapolis, Ind.

[73] Assignee: Thomson Consumer Electronics, Inc., Indianapolis, Ind.

[21] Appl. No.: 876,846

[22] Filed: Apr. 30, 1992

[51] Int. Cl.⁵ .................. H04N 7/01; H04N 5/14
[52] U.S. Cl. ............................ 358/160; 358/140
[58] Field of Search ............. 358/160, 105, 133, 138, 358/140, 141, 31

[56] References Cited

U.S. PATENT DOCUMENTS

| Re. 32,358 | 2/1987 | Powers | 358/21 R |
|---|---|---|---|
| 4,415,931 | 11/1983 | Dischert | 358/242 |
| 4,426,661 | 1/1984 | Okada et al. | 358/140 |
| 4,598,309 | 7/1986 | Casey | 358/11 |
| 4,639,783 | 1/1987 | Fling | 358/166 |
| 4,639,784 | 1/1987 | Fling | 358/167 |
| 4,707,742 | 11/1987 | Field et al. | 358/160 |
| 4,716,462 | 12/1987 | Wargo et al. | 358/166 |
| 5,055,925 | 10/1991 | Lamnabhi | 358/105 |

*Primary Examiner*—Victor R. Kostak
*Attorney, Agent, or Firm*—Joseph S. Tripoli; Peter M. Emanuel; Richard G. Coalter

[57] ABSTRACT

Plural signal delays in a progressive scan system are provided by a field memory having double multiplexing within a video line to provide compacted data samples including interleaved pixels in a first time interval representing field and frame delayed pixel samples and compressed motion data in a second time interval representing frame motion delayed by a field interval. Advantageously, the double multiplexing avoids the need for multiple field delays which otherwise would be required for providing field delayed video, frame delayed video and field delayed motion signals in motion adaptive systems designed for accurate reproduction of small fast moving objects in a displayed image.

1 Claim, 3 Drawing Sheets

VIDEO MEMORY SYSTEM WITH DOUBLE MULTIPLEXING OF VIDEO AND MOTION SAMPLES IN A FIELD MEMORY FOR MOTION ADAPTIVE COMPENSATION OF PROCESSED VIDEO SIGNALS

FIELD OF THE INVENTION

This invention relates generally memory systems and particularly to memory multiplexing systems for providing a plurality of delayed signals including video and motion indicating signals suitable for use in progressive scan conversion systems of the so-called "motion adaptive" type or in other systems wherein delayed video and motion indicating signals may be needed, such as in motion adaptive luminance/chrominance signal separation systems.

BACKGROUND OF THE INVENTION

Television systems are known in which an interlaced video signal is converted to a non-interlaced or "progressively scanned" form in which the number of horizontal lines displayed in a field is doubled. Advantageously, such systems reduce the visibility of the line structure of displayed images.

Since doubling the number of displayed lines requires more lines than are actually transmitted, there have been a number of proposals for obtaining the required "additional" lines. An example of a system in which the required "extra" lines for display are obtained by repeating lines of a received signal is described by R. A. Dischert in U.S. Pat. No. 4,415,931 entitled TELEVISION DISPLAY WITH DOUBLED HORIZONTAL LINES which issued Nov. 15, 1983. An example of a system in which the "extra" or interstitial lines are obtained by interpolation of adjacent vertical lines of the received signal is described by K. H. Powers in U.S. Pat. No. 4,400,719 entitled TELEVISION DISPLAY SYSTEM WITH REDUCED LINE-SCAN ARTIFACTS which issued Aug. 23, 1983.

The above mentioned systems described arrangements in which extra lines for display are derived from a currently received field of a video input signal. This form of progressive scan conversion is commonly known as "intra-field" or "line" conversion and has an advantage in that there are no visible artifacts produced for images containing field-to-field motion. However, there is a disadvantage in that the vertical resolution of displayed images is not improved and may be degraded, particularly where vertical interpolation is employed, and this tends to "soften" displayed images.

It has been widely recognized that the added lines needed for a progressive scan display can be obtained from a previous field rather than from a currently received field. Such systems are known generally as "field" or "inter-field" progressive scan systems and double the number of displayed lines by interleaving lines of a currently received field with lines of a previously received field. An advantage of "field" progressive scan processing is that still images are produced with the full vertical resolution of an originally scanned frame of video.

An example of a "field progressive scan" system is described by Okada et al. in U.S. Pat. No. 4,426,661 entitled TELEVISION RECIEVER INCLUDING A CIRCUIT FOR DOUBLING LINE SCANNING FREQUENCY which issued Jan. 17, 1984. See also, U.K. Application GB 2,114,848A of Achiha et al. published Aug. 24, 1983 and entitled COLOR TELEVISION SIGNAL LINE DOUBLING CIRCUIT. Unfortunately, field progressive scan systems suffer from a problem in that if field-to-field motion exists in a scene the displayed images will be blurred.

A further problem with progressive scan processors of the type in which extra lines are derived from a previous field is that a relatively substantial amount of memory is required for storing (delaying) the lines of the previous field.

Systems have been proposed in which the problem of vertical resolution characteristic of line-progressive scan systems and the problem of motion blur characteristic of field progressive scan systems has been approached by making the systems "motion adaptive". In motion adaptive systems a motion detector is used to switch between the two basic types of processors as a function of motion. For example, when the incoming video signal represents a still image the signal is processed by a field type processor which generates extra lines for display by interleaving the currently received lines with lines of a previous field. Conversely, when the incoming video signal represents a moving image, the extra lines for display are obtained by interpolation (or repeating) lines of the currently received field. For images that are not still and are not in full motion it is customary to "blend" or mix the outputs of line and field type processors in proportion to the magnitude of the motion.

A first example of a "motion adaptive" progressive scan converter is described by Casey in U.S. Pat. No. 4,598,309 entitled TELEVISION RECEIVER THAT INCLUDES A FRAME STORE USING NON-INTERLACED SCANNING FORMAT WITH MOTION COMPENSATION which issued Jul. 1, 1986. In an embodiment of the Casey system, an interlaced signal is converted to non-interlaced form for display. When no picture change (motion) occurs, the picture information of the first and second fields of the input signal are displayed in alternate scan lines of the display device to form a picture frame during one vertical scanning interval. A motion indicating signal, indicative that a picture change occurs in a section of the picture frame, is generated by use of a frame comb filter to detect inter-frame picture variations. The picture change indicative (motion) signal causes the displayed picture information in that section of the picture frame to be derived from one field of the input video signal.

Advantageously, the motion indicating signal in the Casey apparatus is a multi-bit signal having an amplitude representative not only of the presence of motion, but also representative of the relative degree or amplitude of the motion. The selection of interfield or frame processing is provided by a so-called "soft" switch in proportion to the motion signal amplitude to provide a "blended" output signal having field delayed and line-averaged components in proportion to the motion signal amplitude. In other words, rather than merely switching from field to line processing upon detection of motion, the Case apparatus provides a smooth transition from one mode to another by blending the field and line processed video signals in accordance with the motion signal amplitude.

A second example of motion adaptive processing is described by Fling in U.S. Pat. No. 4,639,783 entitled VIDEO SIGNAL FIELD/FRAME STORAGE SYSTEM which issued Jan. 27, 1987. In an embodiment of the Fling system, a multi-bit motion signal is generated by frame comb filtering of the video signal and used to control a "soft" or "proportional" switch much as in the aforementioned Casey apparatus. An advantageous feature of an embodiment of the Fling system concerns the use of a frame memory for obtaining both field delayed and frame delayed signals by means of a multiplexing technique. Specifically, the frame memory is operated in a serial mode at twice the video signal sample rate. Video samples are inputted to the memory on alternate states and alternate samples recovered from the memory are routed back to the vacant memory states. The result is that every other sample in the memory is field delayed and the in-between samples, having gone twice through the memory are frame delayed and so both field delayed and frame delayed samples are available at the memory output. By this means, a frame memory having no field tap thus serves the functions of a pair of cascaded field memories which otherwise would be required to provide a field tap and a frame delayed signal.

Motion adaptation is also used in video signal processing for purposes other than progressive scan processing. Wargo et al., for example describe a motion adaptive comb filtering system for separating a luminance signal Y from a composite video input signal in U.S. Pat. No. 4,716,462 entitled MOTION ADAPTIVE TELEVISION SIGNAL PROCESSING SYSTEM which issued Dec. 29, 1987. In an embodiment of their invention, a motion detector supplies a multi-bit motion signal to a soft switch for selection of line comb and frame comb filtered signals as a function of motion. The line comb filter is used when substantial motion exists, the frame comb filter is selected when essentially no motion exists and the line and frame comb filtered signals are "blended" in proportion to a non-linear control signal K derived from the motion signal for intermediate values of motion.

As a second example, motion adaptation may be used for video noise reduction as described, for example, by Fling in U.S. Pat. No. 4,639,784 entitled VIDEO SIGNAL RECURSIVE FILTER ADAPTIVELY CONTROLLED RESPONSIVE TO THE HISTOR OF IMAGE MOTION which issued Jan. 27, 1987. In an embodiment of the Fling system, a recursive filter for effecting noise reduction of video signals, sums current and delayed signals and includes a motion detector for detecting inter-frame image motion. Signal from the motion detector is stored to provide a history of image motion. A decoder coupled to the motion detector and also responsive to the stored motion history develops control sequences for scaling the signal contributions which form the recursive filter sums. In a specific implementation of the Fling apparatus, a frame delay is imparted to a one-bit motion signal using the same frame memory as for the active video signal being filtered. This is done by accumulating motion bits for one line interval and inserting the accumulated bits in the horizontal blanking interval of the next line stored in the frame memory with the active video bits being stored only in the active video portion of the line.

SUMMARY OF THE INVENTION

To summarize the foregoing, in conventional motion adaptive interlace to progressive scan (non-interlace) conversion systems a relatively large memory is required to store fields of video information. Typically, the memory storage may be used for three types of video signals.

As a first example of such storage requirements, an incoming video signal needs to be delayed for one field to provide a source for the "field jam" signal in stationary portions of an image. The term "field jam" refers to the extra or "interstitial" line for display which are inserted between the currently received video lines. In other words, the additional scan lines for display are obtained from the previous field in stationary regions and from adjacent scan lines in moving regions in such "motion adaptive" or motion compensated progressive scan conversion systems.

As another example of memory storage requirements, additional memory is needed to determine which portions of an image are stationary. For this purpose, it is customary to compare the video information from adjacent frames of the image, which are separated by two field times. A frame delayed signal can obtained by delaying the above field delayed signal by an additional field, requiring an additional field of memory. The result of the comparison is typically encoded into a so-called "motion signal" which may be of relatively low resolution (e.g., one to four bits).

It is herein recognized that further storage requirements are desirable in motion adaptive progressive scan conversion systems where one wishes to achieve a high level of confidence regarding the presence of motion.

In more detail, the motion information obtained by comparing the frame delayed video with the arriving video provides a good indication whether a particular pixel (picture element) of the present field (or previous frame) is moving. However, it is not a good indicator of whether the corresponding pixel of the previous field was displaying a moving object, particularly if the object was small and fast-moving (e.g., a pitched base ball or a served tennis ball). Since it is the information from the previous field that will be used for the "field jam" signal, to avoid motion artifacts, it is desirable to establish with a relatively high confidence level that the signal is stationary prior to using it.

In a typical motion adaptive system, a motion signal is generated for a given pixel (picture element) during the previous field. By delaying this motion signal by one field its information can be used to help decide whether to consider the pixel as moving or stationary. This represents a third class of video signals that requires field storage. Fortunately, since the motion signal may be coarsely quantized, substantially less memory is required to store the motion signal for a field than to store the video signal for a field.

The present invention is directed to a specific memory arrangement for efficiently meeting the storage requirements of the above three signals (two video signals and one motion signal). Advantageously, in accordance with the invention, all the storage requirements may be met by use of a single frame memory (which requires no taps) and a one line buffer memory.

In an illustrated embodiment of the invention, plural signal delays in a progressive scan system are provided by a field memory having double multiplexing within a video line to provide compacted data samples including interleaved pixels in a first time interval representing field and frame delayed pixel samples and time compressed motion data in a second time interval representing a motion signal delayed by a field interval. Advantageously, the double multiplexing avoids the need for three field delays which otherwise would be required for providing field delayed video, frame delayed video and field delayed motion signals in motion adaptive systems designed for accurate reproduction of small fast moving objects in a displayed image.

A memory system embodying the invention includes a field memory. A first multiplexor interleaves video samples supplied to the memory with video samples outputted from the memory for storage during a first time interval of each video line. A second multiplexor time compresses and stores motion data associated with a previous line of video samples in a second time interval of the video line. The first multiplexor outputs video samples that have passed through the field memory one time to provide field delayed video samples and outputs video samples that have passed through the field memory two times to provide a framed delayed video output signal. The second multiplexor recovers the time compressed motion samples and expands them to provide a field delayed motion output signal.

BRIEF DESCRIPTION OF THE DRAWING

The invention is illustrated in the accompanying drawing wherein like elements are denoted by like reference designators and in which.

DETAILED DESCRIPTION

Figure 1:
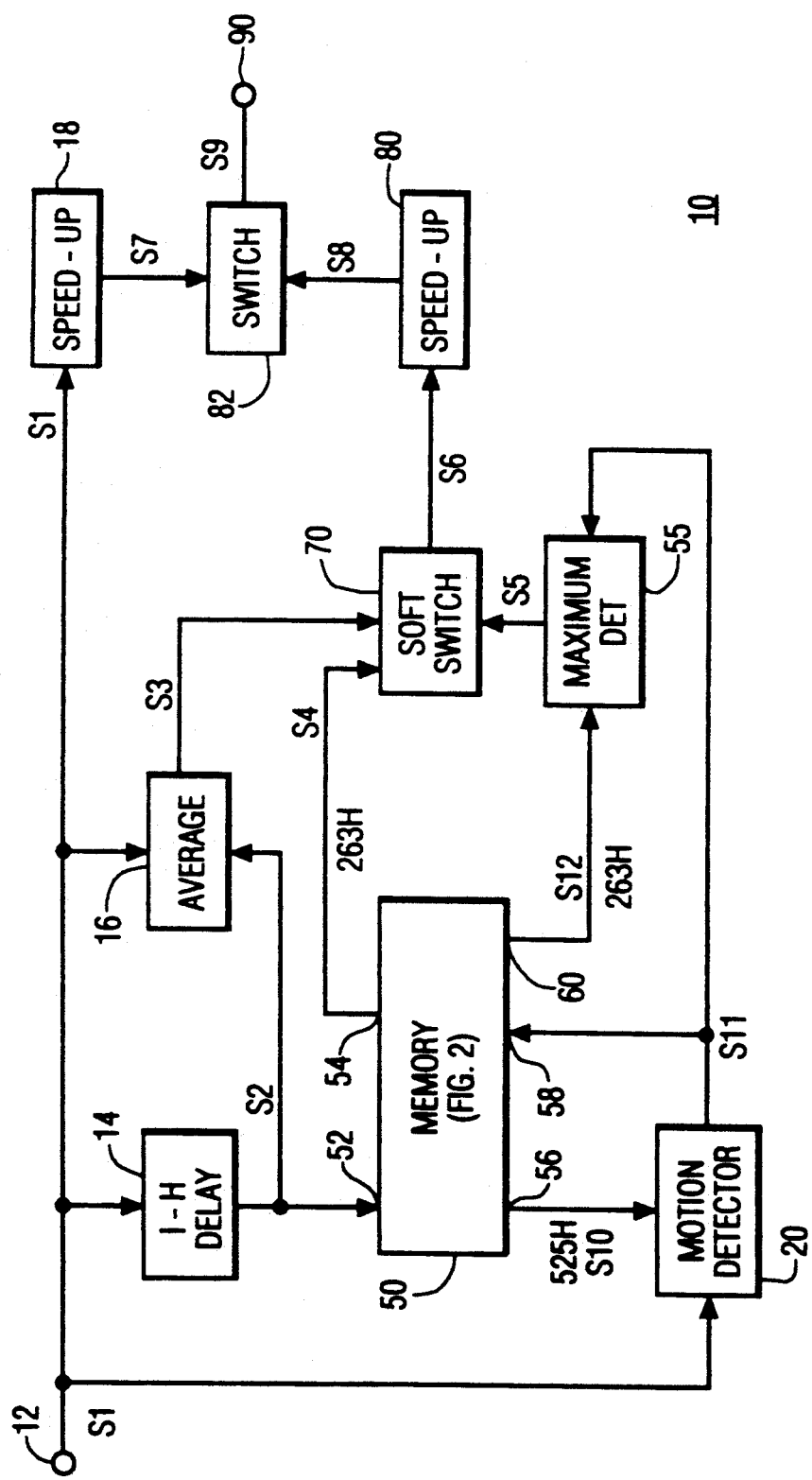
FIG. 1 is a block diagram illustrating interstitial line generation in a motion adaptive progressive scan system embodying the invention illustrating generation of field and frame delayed video signals and a field delayed motion signal for use in a motion compensated progressive scan system wherein the various field delays, in accordance with the invention, are provided by a common memory.

The present invention may be used in various application where motion compensation with simplified memory requirements is desired. For purposes of illustration, the application of progressive scan processing is illustrated in FIG. 1. As previously described with regard to the prior art discussed above, the principles of the present invention may also be applied to other applications such as luminance/chrominance signal separation and in noise reduction systems.

The progressive scan system 10 of FIG. 1 comprises an input terminal 12 for receiving a video input signal S1 of digital form sampled at a given sampling rate. Illustratively, the sample rate FS may be three or four times the color subcarrier frequency or a multiple of the horizontal line rate that exceeds the Nyquist rate for the video input signal. Terminal 12 is connected to inputs of a one-line (1-H) delay memory14, an averaging circuit 16, a speed-up circuit 18 and a motion detector 20. The line delayed signal S2 provided by memory 14 is applied to a second input of the averaging circuit 16 to provide a line averaged (vertically interpolated) output signal S3. The line delayed signal S2 is also applied to a first input 52 of a memory system 50 that provides a field delay of 262 lines at an output 54. Since one line of delay is provided by memory 14, the net delay of the field delayed signal S4 equals 263 lines.

The line averaged signal S3 and the field delayed signal S4 are applied to a "soft switch" 70 controlled by a motion related control signal S5. When no motion is present, switch 70 selects the field delayed signal S4. When high motion is present, switch 70 selects the line averaged signal S3. For intermediate values of the motion control signal S5, switch 70 selects a proportional "blend" of the line averaged and field delayed signals (S6) as the so-called "interstitial" line for display in the system.

The current video line S1 and the motion adapted video line S6 are applied to respective "speed-up" circuits (of conventional design) 18 and 80 which time compress the signals by a factor of two. Thereafter, the time compressed signals S7 and S8 are applied to a multiplex switch 82 that interleaves the current and motion adapted interstitial lines to provide a progressive scan output signal S9 at output terminal 90.

The motion control signal S5 for controlling the soft or "proportional" switch 70 is developed by means of a motion detector 20, the memory 50 and a maximum value detector 55. Specifically, motion detector 20 compares the input signal S1 with a video signal S10 that has been frame delayed by memory 50 to provide an output motion signal S11 indicative of motion from one frame to the next. This motion signal is sent back to the memory 50 and delayed for a period of 263 lines (one field in the NTSC system) to provide a field delayed motion signal S12. The motion indicating control signal S5 is derived by a maximum detector 55 that outputs the greatest of the un-delayed and field delayed motion signals S11 and S12. By comparing the current and field delayed motion signals, the maximum value detector provides a superior estimate of field to field motion than using the frame motion signal alone and so the detection of small fast-moving objects is improved.

Advantageously, in the system of FIG. 1 a single field memory provides a field delay for signal S4, a frame delay for signal S10 and a field delay for the motion signal S11. If implemented directly, it would appear that three fields of memory delay would be required. This is avoided by the doubly multiplexed memory system of FIG. 2.

Figure 2:
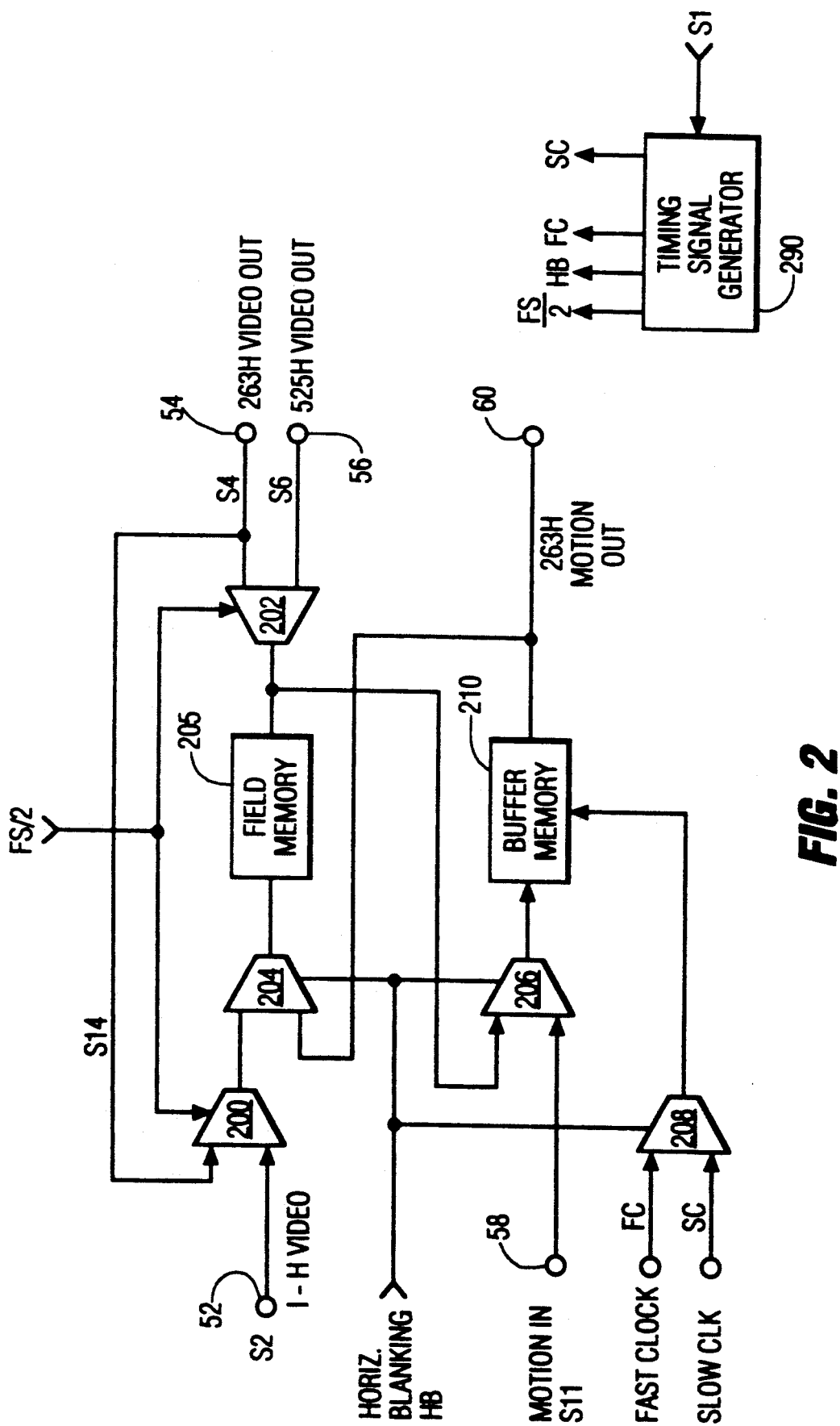
FIG. 2 is a detailed block diagram of a memory system embodying the invention.

The FIG. 2 system comprises five multiplex switches (200;, 202, 204, 206 and 208), a field memory 205 for storing 262 lines of video and motion information and a buffer memory 210 for providing time compression and expansion motion data.

Figure 3:
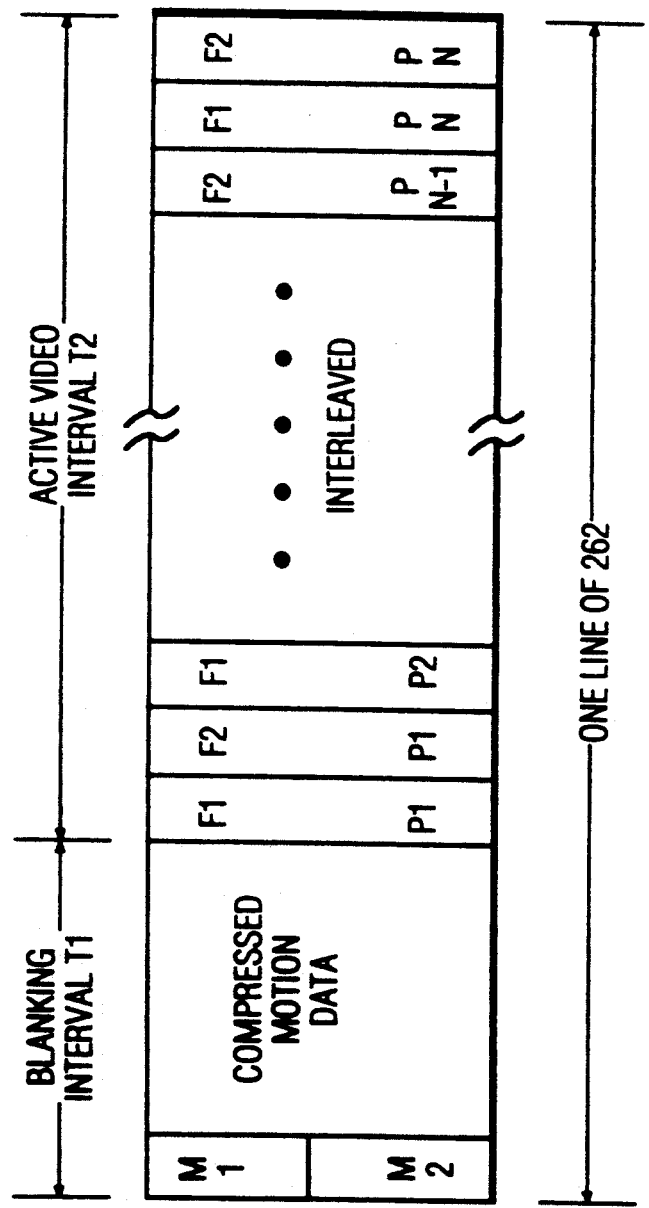
FIG. 3 is a timing diagram illustrating the operation of the memory system of FIG. 2.

The system includes inputs 52 and 58 for providing video samples and motion samples, respectively and a field memory 205. The field memory 205 is a dual ported field memory having separate input and output ports. A first multiplexor, (comprising multiplex switches 200 and 202) is coupled to the field memory 205 for interleaving the video samples S2 supplied to the field memory from delay unit 14 with samples S14 recovered from the field memory during the active video interval T2. As shown in FIG. 3, this results in line interleaved video samples with every other sample being obtained from the input signal and alternate samples being twice delayed thereby providing at outputs 54 and 56 the video signal S1 delayed by 263 and 525 lines respectively. This interleaving by the first multiplexing switch 200, 202 is shown in FIG. 3. As illustrated, the active video information is delayed by one field and by two fields, the delayed active video samples being separated and applied to the outputs 54 and 56 by means of the output switch 202 of the first multiplexor 200, 202.

Motion signal delay is provided by a second multiplexor and a line buffer circuit 206, 208, and 210. The second multiplexor and line buffer circuit time compresses and stores the motion data associated with a previous line of video samples in a second time interval (T1 of FIG. 3) of each video line stored in the field memory 205.

The first multiplexor (200, 202) has first and second outputs providing, respectively, video samples that have passed through the field memory 205 one time to provide the field delayed video output signal 54 at terminal 54 and a second output 56 providing a frame delayed video output signal for video samples having passed through the field memory two times as a result of the feedback provided by the first multiplexing circuit (200, 202).

The second multiplexor and line buffer circuit comprises switches 204, 206 and 208 and a buffer memory 210 connected as shown in FIG. 2. Specifically, the second multiplexor and line burrer circuit time compresses and stores motion data associated with a previous line of video samples in a second time interval of each video line in the field memory 205. Specifically, motion samples are accumulated during the active video interval T2 of one line and on the following line the samples are compressed into the time interval T1 (horizontal blanking) and stored in the memory 205. Later, the motion samples are recovered and time expanded for use with the original (non-delayed motion samples) for providing, as previously explained, a better estimate of field to field motion for small fast moving objects than can be obtained by using only a frame motion indicating signal.

In more detail, the horizontal blanking signal, provided along with other timing signals from a timing signal generator 290, is used to operate multiplex switches 204 and 206 as well as selecting fast and slow clocks for the buffer memory 210. The slow clock signal is used during a video line for loading the buffer memory with incoming motion data during the active interval T2 (see FIG. 3). At the start of another line, timing signal generator supplies the fast clock signal to memory 210 for compressing the motion data into the horizontal blanking interval of the video data being stored by the field memory 205. Later, upon recovery of the stored data, the switch 208 selects a slow clock signal for reading out and expanding the buffer data in memory 210.

To summarize operation described above, the memory system of FIG. 2 employs a field memory 205 and a buffer memory 210 and a plurality of multiplex switches to efficiently generate the three delayed signals needed for motion adaptive processing of small, fast moving objects. All three signals (field delayed video, frame delayed video and the motion signal) occur at the same pixel rate (which may be the full bandwidth video pixel rate if the video signal is not subjected to sub-sampling and may be of a lower rate if only the low frequencies of the video signal are motion adaptively processed). The two video signals (S4 and S6) are sample-interleaved (as shown in FIG. 3 in interval T2) to generate a single signal having the bit rate of each. This interleaved signal is stored in a field memory 205 during the active portion of each video line interval (see FIG. 3). Simultaneously, the motion signal S11, obtained by comparing incoming and frame-delayed video is stored in the buffer memory 210 having sufficient capacity to store one line of motion data corresponding to the active portion of the same video line.

During the horizontal blanking interval T1, (as shown in FIG. 3) when no video data is available to be stored in the field memory 205, the contents of the buffer memory 210 are transferred to the field memory 205. Since the duration of the blanking interval is much shorter than the duration of the active portion of the line, this transfer occurs at a much higher rate than the original writing of the buffer memory as determined by the clock switch 208. The buffer memory is a "two-port" design, allowing simultaneous reading and writing. Accordingly, the field delayed motion signal from the field memory can also be written into the buffer as motion data from the previous line is read from the buffer into the field memory. This same two-port structure then allows the previous field motion signal to be read from the buffer memory 210 at the reduced rate ("slow clock" provided by generator 290) during the active portion of the subsequent line interval, while simultaneously writing motion data for the subsequent line into the buffer; this occurs while the field and frame delayed video information is being read from the field memory.

One effect of the buffer memory is to insert an additional delay of one line period into the motion signal, compared to what the video signal experiences. This is desirable in some system configurations. An example as shown functionally FIG. 1. The video signal is delayed by 1-H (one line) prior to being stored in the field memory. The input and output of the 1-H delay are averaged to obtain an estimate for the additional line information which is used in moving portions of the image. The field delay is configured to give a delay of 262 H (for NTSC standard receivers) so that the field delayed output has a net delay of 263 H and the frame delay output has a net delay of 525 lines. Under these conditions, the added delay provided by the motion buffer imparts a total delay of 263 lines to the motion signal. As a result, the delayed motion corresponds to the same line as the field delayed video.

Thus there has been shown and described a video memory configuration for a motion adaptive progressive scan system in which a single field memory efficiently provides field delayed active video, frame delayed active video and a field delayed motion indicating signal. As previously explained, the principles of the invention may also be applied to other applications such as motion adaptive luminance/chrominance signal separation.

What is claimed is:
1. Memory apparatus comprising, in combination:
a source for providing video samples and motion samples;
a field memory;
first circuit means coupled to said field memory for interleaving said video samples supplied to said memory with video samples outputted from said memory for storage in said field memory during a first time interval of each video line;
second circuit means for time compressing and storing motion data associated with a previous line of video samples in a second time interval of each video line in said field memory;
said first circuit means having first and second outputs providing, respectively, video samples that have passed through the field memory one time to provide a field delayed video output signal and having a second output providing a frame delayed output signal for video samples having passed through said field memory two times;
said second circuit means being coupled to an output of said field memory for recovering the time compressed motion samples and for decompressing the samples to provide a field delayed motion indicating output signal.

* * * * *